April 9, 1929.  M. MENDEL  1,708,278

TOOL HANDLE

Filed April 18, 1927

INVENTOR
BY Michael Mendel
ATTORNEY

Patented Apr. 9, 1929.

1,708,278

UNITED STATES PATENT OFFICE.

MICHAEL MENDEL, OF BROOKLYN, NEW YORK.

TOOL HANDLE.

Application filed April 18, 1927. Serial No. 184,456.

This invention relates generally to tools, and has more particular reference to a novel tool handle structure.

The invention has for an object the provision of a tool handle structure which will securely and efficiently hold a tool without the use of rivets or screws cooperating directly with the tool. A saw may be considered for the purposes of disclosing the invention, though the invention is not limited to the saw, it being applicable to other tools also. Commonly a handle is attached to the blade of a saw by means of screws, or rivets passing through the blade and handle. Necessarily the contacting surface between the blade and adjacent portions of the screws is small, and therefore a large strain exists between these parts, resulting in rapid wear and a loosening of the parts. It is an object of this invention to overcome these defects.

The invention has for a further object, the provision of a tool handle structure which may be applied to tools at a reasonable cost.

For further comprehension of the invention and of the objects and advantages thereof, reference will be had to the following description and accompanying drawing and to the appended claims in which the various novel features of the invention are more particularly set forth.

Referring to the accompanying drawing, forming a material part of this disclosure:

Figure 1:
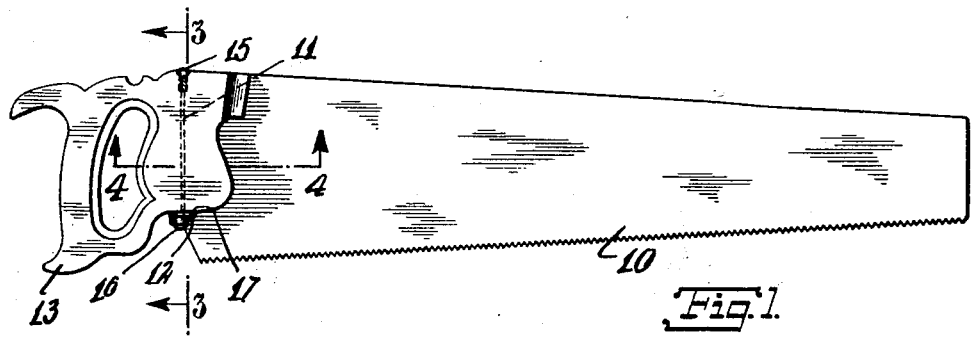
Fig. 1 is a side view of a saw embodying the principles of this invention.
Figure 2:
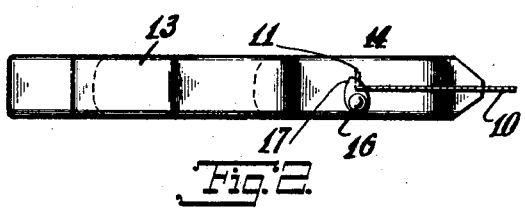
Fig. 2 is a fragmentary bottom view thereof.
Figure 3:
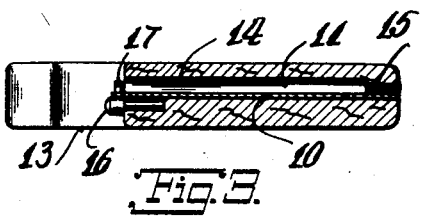
Fig. 3 is a vertical sectional view, taken on the line 3—3 of Fig. 1.

The reference numeral 10 indicates generally a saw blade provided at one edge with a projecting portion 11, and on the same edge, but below the projecting portion 11, with a niche 12. A handle 13 is provided with a substantially arranged L-slot 14, with the long arm of the L-slot cut in from one end of the handle. The saw blade 10 is slid into the long arm of the L-slot, and the projection 11 into the short arm. A stop screw 15 is engaged in the handle 13 and abuts against the top of the projecting portion 11, determining the amount to which the blade enters the handle. A pin 16 is engaged in the handle 13 and has a retaining plate 17 pivotally mounted thereto, the retaining plate being swingable to engage in the niche 12 and hold the blade against displacement from the handle.

Figure 4:
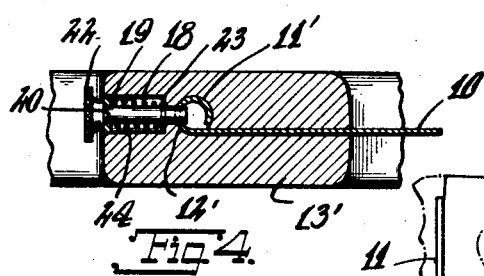
Fig. 4 is a horizontal sectional view corresponding to the section taken on the line 4—4 of Fig. 1 but disclosing a modification of the invention.

In the modification illustrated in Fig. 4 the saw blade 10 is provided with a circularly shaped projecting portion 11' having an aperture 12' therein and is slidably arranged in the handle 13'. The handle 13' is formed with a cavity 18 closed by top member 19 having an aperture 20 through which rod 21 is slidably disposed. The top of rod 21 is provided with a knurled head 22, and the rod has near its bottom end a flange 23. A spring 24 is encased in the cavity 18 and acts between the top member 19 and the flange 23, normally urging one end of the rod into the aperture 12' holding the blade 10 against displacement.

Figure 5:
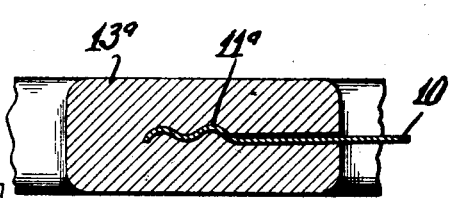
Fig. 5 is a horizontal sectional view similar to Fig. 4, but disclosing another modification of the invention.
Figure 6:
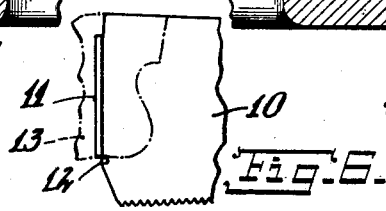
Fig. 6 is a fragmentary side view of the saw blade of Fig. 1.

The modification illustrated in Fig. 5 discloses the blade 10 provided with a corrugated end 11$^a$, and slidably arranged in handle 13$^a$. The means illustrated in Fig. 1 may hold this blade against displacement.

While I have illustrated and described the preferred form, construction and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention, what I claim as new and desire to secure by United States Letters Patent is:

The combination with a saw handle, having a blade slidable therein, of a screw engaged in the handle and forming an abutment for the blade to prevent sliding in one direction, the blade being formed with a niche, a pin engaged in the handle, and a retaining plate swingably connected with the pin, the said screw being so positioned that when the blade abuts the screw the niche is aligned for engagement with the retaining plate, as a means for holding the blade in place.

In testimony whereof I have affixed my signature.

MICHAEL MENDEL.